(12) United States Patent
Wei et al.

(10) Patent No.: US 11,099,951 B2
(45) Date of Patent: Aug. 24, 2021

(54) CYBERATTACK-RESILIENT CONTROL SYSTEM DESIGN

(71) Applicant: Siemens Aktiengesellschaft, Munich (DE)

(72) Inventors: Dong Wei, Edison, NJ (US); Lingyun Wang, Princeton, NJ (US); Leandro Pfleger de Aguiar, Robbinsville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 16/331,159

(22) PCT Filed: Sep. 16, 2016

(86) PCT No.: PCT/US2016/052037
§ 371 (c)(1),
(2) Date: Mar. 7, 2019

(87) PCT Pub. No.: WO2018/052435
PCT Pub. Date: Mar. 22, 2018

(65) Prior Publication Data
US 2019/0220374 A1    Jul. 18, 2019

(51) Int. Cl.
*G06F 11/20* (2006.01)
*H04L 29/06* (2006.01)
(Continued)

(52) U.S. Cl.
CPC ........ *G06F 11/2023* (2013.01); *G05B 19/058* (2013.01); *G06F 11/1479* (2013.01);
(Continued)

(58) Field of Classification Search
CPC . G06F 11/2023; G06F 11/202; G06F 11/2033
(Continued)

(56) References Cited

U.S. PATENT DOCUMENTS 10,445,192 B2 * 10/2019 Gandelsman ....... G06F 11/1464
10,505,955 B2 * 12/2019 Mestha .............. H04L 63/1425
(Continued)

FOREIGN PATENT DOCUMENTS

EP         1857934 A1    11/2007
WO     2014111920 A1     7/2014

OTHER PUBLICATIONS

International Search Report dated Nov. 4, 2016; Application No. PCT/US2016/052037; Filing Date: Sep. 16, 2016; 14 pages.

*Primary Examiner* — Chae M Ko (57) ABSTRACT

A method for performing security failover in an industrial production environment includes a programmable logic controller (PLC) receiving notification that a function block (FB) or a function (FC) on the programmable logic controller has been maliciously revised. The PLC next determines whether the function block or the function is also maliciously revised on a failover computing device. If the failover computing device is not maliciously revised, a failover operation is performed by the PLC. This operation includes sending a data block comprising one or more input parameters to the function block or the function and receiving an output data resulting from executing the function block or the function with the data block on the failover computing device.

19 Claims, 7 Drawing Sheets (51) Int. Cl.
  *G05B 19/05* (2006.01)
  *G06F 11/14* (2006.01)
  *G06F 21/74* (2013.01)
  *H04L 29/08* (2006.01)
  *H04L 9/32* (2006.01)

(52) U.S. Cl.
  CPC .......... *G06F 11/203* (2013.01); *H04L 63/123* (2013.01); *H04L 63/1416* (2013.01); *G05B 2219/13107* (2013.01); *G05B 2219/24169* (2013.01); *G05B 2219/24211* (2013.01); *G06F 11/2035* (2013.01); *G06F 21/74* (2013.01); *G06F 2201/805* (2013.01); *H04L 9/3247* (2013.01); *H04L 67/12* (2013.01)

(58) Field of Classification Search
  USPC ........................................................ 714/4.11
  See application file for complete search history.

(56) References Cited

U.S. PATENT DOCUMENTS

| | | |
|---|---|---|
| 2015/0032232 A1 | 1/2015 | Soldi |
| 2015/0046697 A1 | 2/2015 | Galpin et al. |
| 2016/0306337 A1* | 10/2016 | Gandelsman ...... G05B 19/4185 |
| 2017/0093910 A1* | 3/2017 | Gukal ................. H04L 63/1425 |
| 2017/0201543 A1* | 7/2017 | Terry ................. H04L 63/1425 |
| 2017/0264629 A1* | 9/2017 | Wei .................... H04L 63/1433 |

* cited by examiner

CYBERATTACK-RESILIENT CONTROL SYSTEM DESIGN

This application is a national phase filing under 35 U.S.C. § 371 of International Patent Application No. PCT/US2016/052037, filed Sep. 16, 2016, which is incorporated herein by reference in its entirety.

TECHNICAL FIELD

The present invention relates generally to improving the resiliency of control systems against cyberattacks using various security failover procedures. The disclosed technology may be applied to, for example, various automated production environments where industrial controllers such as programmable logic controllers (PLCs) and distributed control systems (DCS) are used.

BACKGROUND

Conventional security solutions for plant floor automation and control systems were developed based on the concept of production cell. The network of each production cell is isolated from others and protected by a security device such as firewall/VPN (Virtual Private Network) concentrator. This solution was developed based on the assumption that cyberattacks come from the outside world (i.e., via the communication link between the production cell network and the office network). Additionally, control systems and security systems run individually and independently. Thus, automation engineers and IT security professionals design, program, operate and monitor control and security, respectively.

Several issues exist with the conventional automation security solution. The assumption of "production cells" no longer holds because the production cell networks become more and more open and dynamic since more mobile devices, wireless sensors, etc., are used for data collection and diagnostics. These devices are connected to plant floor systems directly and, thus presenting a direct security risk to automation devices. Furthermore, manufacturing systems based on Internet of Things (IoT) paradigms require control systems to exchange data and interact with memory devices (and even smart devices) attached to incoming materials and workpiece. This places an increased risk of cyberattacks that cannot be addressed by perimeter protection mechanisms as well.

Accordingly, it is desired to provide security failover mechanisms that may be implemented at the control layer to address cyberattacks in a manner that minimizes the adverse impact on the overall automation system.

SUMMARY

Embodiments of the present invention address and overcome one or more of the above shortcomings and drawbacks, by providing methods, systems, and apparatuses related to improving the resiliency of control systems against cyberattacks using various security failover procedures. The techniques described herein are able to minimize the adverse impacts of cyberattacks and, thus, improve control performance in terms of resilience.

According to some embodiments, a method for performing security failover in an industrial production environment includes a programmable logic controller (PLC) receiving notification that a function block (FB) or a function (FC) on the programmable logic controller has been maliciously revised. The PLC next determines whether the function block or the function is also maliciously revised on a failover computing device. Various techniques may be used for detecting malicious revision. For example, in some embodiments, the function block or the function comprises a data portion and a digital signature portion. The PLC may then determine that the function block or the function is or is not maliciously revised on the failover computing device by determining whether the digital signature portion of the function block or the function on the failover computing device is valid. In some embodiments, the function block or the function on the failover computing device is a revised replica of the function block or the function on the PLC which, as explained in further detail below, provides further protection against malicious revision. If the failover computing device is not maliciously revised, a failover operation is performed by the PLC. This operation includes sending a data block comprising one or more input parameters to the function block or the function and receiving an output data resulting from executing the function block or the function with the data block on the failover computing device.

In some embodiments of the aforementioned method, the failover computing device is an automation device in the industrial production environment. For example, the failover computing device may be a second PLC, or a PC which can run the control programs in the PLC. The failover computing device may be located in a computing environment remote from the industrial production environment or on the local industrial network.

According to other embodiments of the present invention, a method for performing security failover in an industrial production environment includes a PLC receiving a data block from an automation device over a network communication session and determining that the data block has been maliciously revised. For example, the data block may be a memory block comprising a data portion and a digital signature portion and the PLC determines that the memory block has been maliciously revised by determining that the digital signature portion is invalid. In response to determining that the data block has been maliciously revised, the data block is replaced with a revised replica of the data block for all subsequent operations performed by the PLC using the data block.

In some embodiments the revised replica of the data block is a copy of the data block previously received from the automation device. In other embodiments, the revised replica is created by extrapolating data from one or more instances of the data block previously received from the automation device. In some embodiments revised replica of the data block comprises one or more commands/data to place a production process operated by the PLC in safe mode or stop the production process in a safe way.

As an alternative or supplement to the use of a revised replica in the aforementioned method, a plurality of alternative network sessions through one or more intermediary PLCs may be utilized for future communications with the automation device. For example, the alternative network sessions may be used by transmitting an inquiry message to a second PLC over a second network communication session inquiring whether the second PLC is communicating with the automation device. A response message may then be received from the second PLC indicating that the second PLC is communicating with the automation device over a third communication session. Then, subsequent data blocks may be transmitted to the automation device via the second PLC using the second network communication session and the third communication session.

According to another aspect of the present invention, a system for performing security failover in an industrial production environment includes a PLC comprising a non-transitory computer-readable medium storing an application program comprising plurality of organizational blocks, a plurality of function blocks, and a plurality of data blocks. The PLC further includes one or more security function blocks configured to perform a failover operation in response to detecting a maliciously revised block among the organization blocks, function blocks, or data blocks. This failover operation comprises one or more of the following. First, if the maliciously revised block is a function block or a function, an equivalent function block or function located on a failover computing device is used to perform operations for the function block or the function during execution of the application program. Second, if the maliciously revised block is received from an automation device over a first networking session, a plurality of alternative network sessions through one or more intermediary PLCs are used for future communications with the automation device. Third, the maliciously revised block may be replaced with a revised replica of the maliciously revised block for all subsequent operations performed by the PLC using the maliciously revised block.

In some embodiments of the system, the failover computing device is located in the industrial production environment. For example, the failover computing device may be a second PLC, or a PC which can run the application programs in the PLC. The computing device may be located in a computing environment remote from the industrial production environment or it may be connected to the PLC over the industrial network.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to improving the resiliency of control systems against cyberattacks using various security failover procedures. Control systems, such as a Programmable Logic Controllers (PLC) or a Distributed Control System (DCS) are becoming more and more powerful with multi-core, more computational power and much bigger memory space. Thus, it makes sense to move some cyber security procedures from security devices, such as firewalls and VPNs at the production cell boundary, to control systems themselves without compromising control performance. The techniques described herein can maintain basic control functions even when part of PLC applications are compromised, and hence improving the performance in terms of system resilience. Moreover, the disclosed techniques can minimize the adverse impacts of cyberattacks which modify PLC applications or communication data blocks maliciously.

Figure 1:
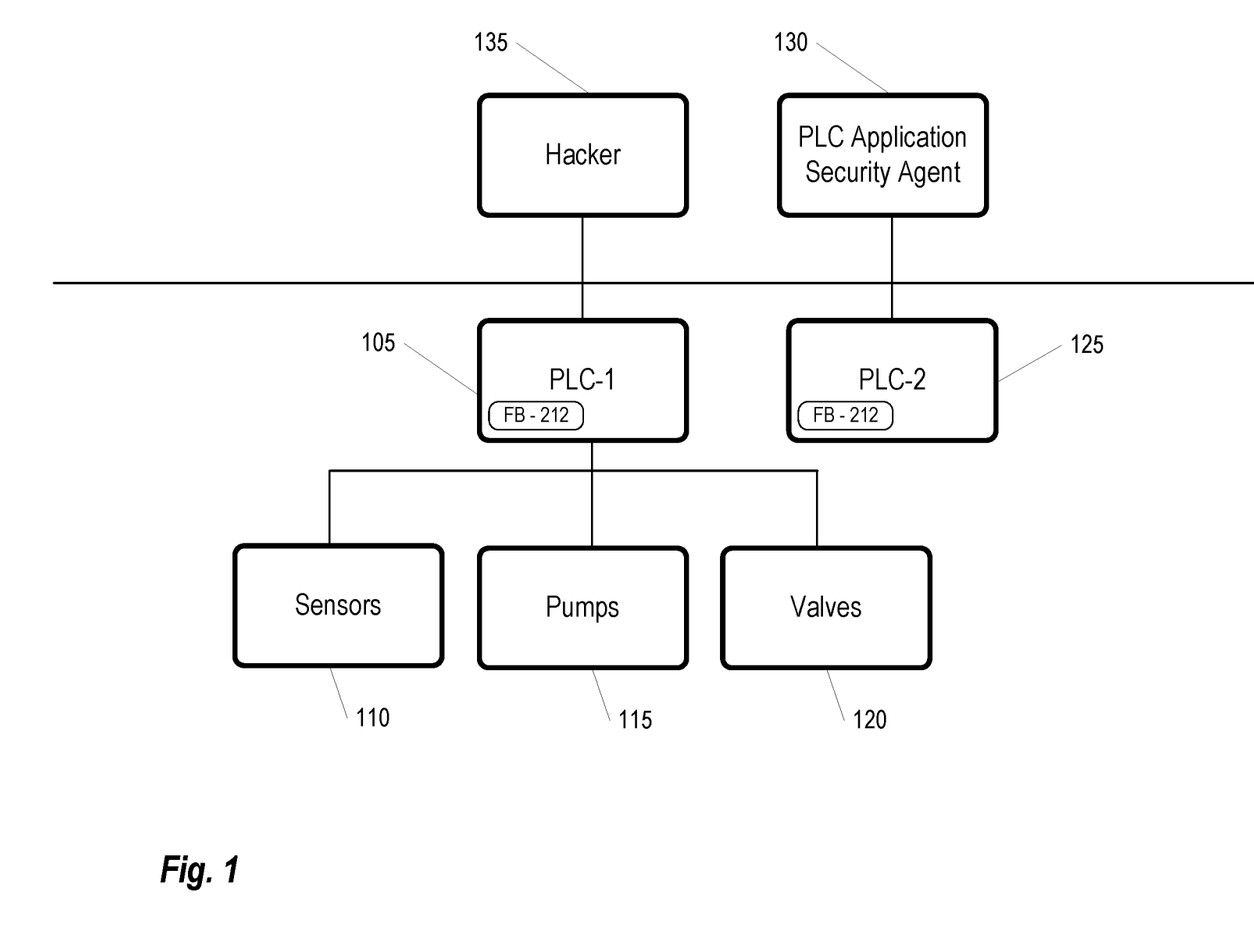
FIG. 1 illustrates how failover can be managed according to some embodiments by using other PLCs when the function blocks (FBs) and/or functions (FCs) in one PLC are comprised.

FIG. 1 illustrates how failover can be managed according to some embodiments by using other PLCs when the FBs and/or functions (FCs) in one PLC are comprised. In this example, assume that FB-212 in PLC-1 105 is a control function block for a cooling pump station (including Sensors 110, Pumps 115, and Valves 120). FB-212 is also used in PLC-2 125. In some embodiments, FB-212 may be used to run a different cooling pumping station (not shown in FIG. 1) or a similar set of devices. Alternatively, in other embodiments, FB-212 may just remain idle in PLC-2 125 when it's not in use.

A PLC Application Security Agent 130 is configured to perform an application integrity check on the blocks used by each PLC 105, 125, for example, by periodically verifying and validating blocks against a pre-generated digital signature. When the PLC Application Security Agent 130 detects that FB-212 in PLC-1 105 is maliciously revised by Hacker 135, PLC-1 105 creates a connection with PLC-2 125 if no communication session to PLC-2 125 current exists. Next, PLC-1 105 checks if FB-112 is maliciously revised or not. If FB-112 in PLC-2 125 is fine, PLC-1 105 sends a Data Block (DB) which contains all parameters for cooling water pump station control (including architecture and real time sensor data such as temperature) to PLC-2 125. PLC-2 125 runs FB-212 in PLC-2 125 and calculates the output data, such as commands (open/close) for pumps and setting (50%) for proportional valves. Next PLC-2 125 sends the output data to PLC-1 105. Then, PLC-1 105 uses the received data to control executive devices or for other applications in PLC-1 105.

It should be noted that the example presented in FIG. 1 may degrade the control performance in terms of responsiveness due to data exchange over the network. However, it can maintain the major control functionality even when FB-212 in PLC-1 105 is revised maliciously and thus minimizing the adverse impact of this cyberattack.

Figure 2A:
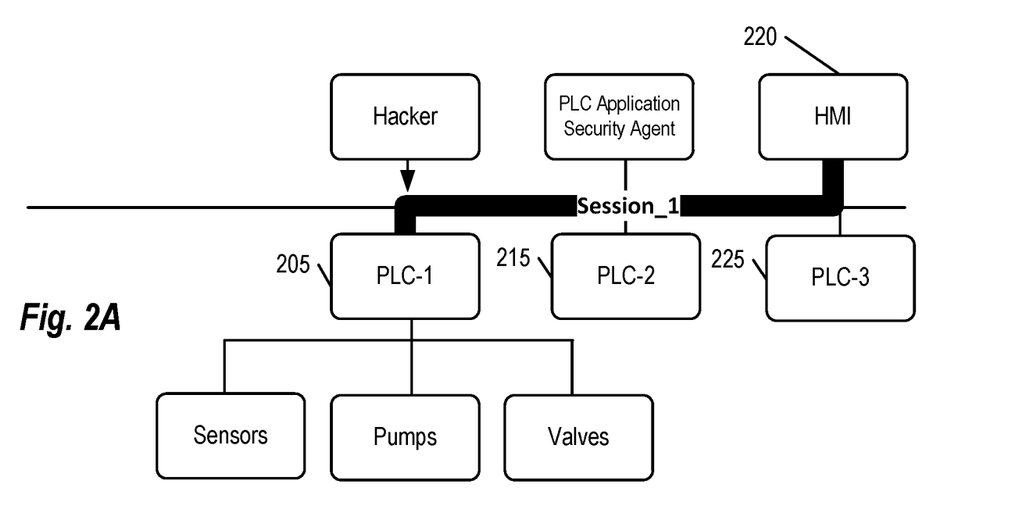
FIG. 2A provides an example of failover according to some embodiments where an alternate communication session is used when one communication session is comprised.
Figure 2B:
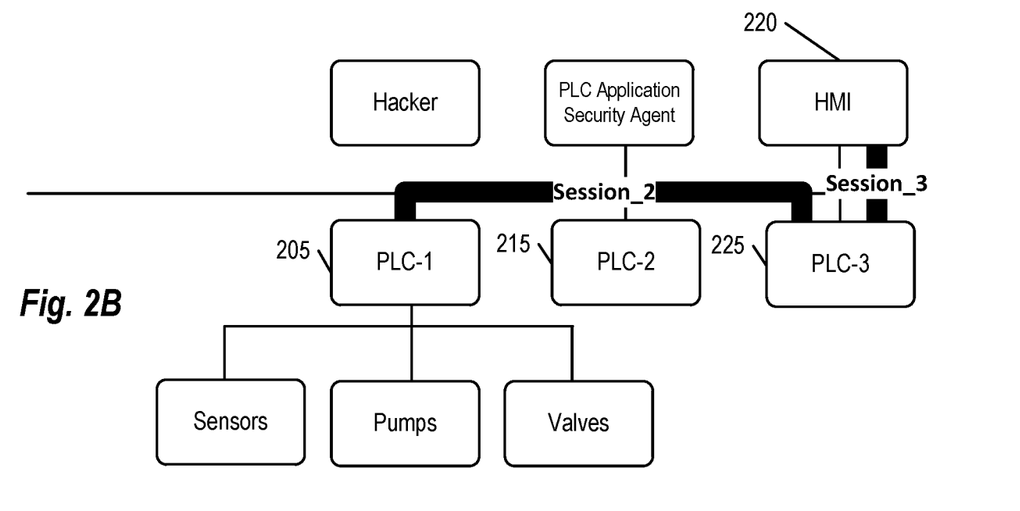
FIG. 2B continues the example presented in FIG. 2A.

FIGS. 2A and 2B provide an example of failover according to some embodiments where an alternate communication session is used when one communication session is comprised. In this example, there are three communication sessions among Human-Machine Interface (HMI) 220 and PLCs. FIG. 2A illustrates the first session ("Session 1"), where PLC-1 205 sends DB-101 to HMI 220 and receives data from HMI 220 in DB-102. PLC-1 205 sends DB-201 to PLC-3 225 and receives data from PLC-3 225 in DB-202.

PLC-3 225 sends DB-211 to HMI 220 and receives data from HMI 220 in DB-212. Assume that each DB used for communication includes data part and digital signature part.

When PLC-1 205 detects that DB 102 from HMI 220 to PLC-1 205 in PLC-1 205 is maliciously revised (since the digital signature is invalid), the following operations may be performed as shown in FIG. 2B. First, PLC-1 205 checks if there are other routes to exchange data with the HMI 220 by sending inquiring message to other communication partners and finds communication session Session_2 with the PLC-3 225. PLC-3 225 replies that the communication Session_3 exists between itself and the HMI 220 and the session is currently fully operational. PLC-1 205 re-packs data in DB-101 into DB-201 and sends DB-201 to PLC-3 225. PLC-3 225 re-packs the data into DB-201 and sends it to HMI 220. Next, HMI 220 re-packs data which should be sent to PLC-1 205 and sends it to PLC-3 225. PLC-3 225 re-packs the received data and sends to PLC-1 205.

Note that this solution presented in FIG. 2 may degrade the control performance in terms of responsiveness due to data exchange over the network as well. However, it can maintain the major control functionality even when DB-102, received from HMI 220 in PLC-1 205 is revised maliciously and thus minimizing the adverse impact of this cyberattack.

Figure 3:
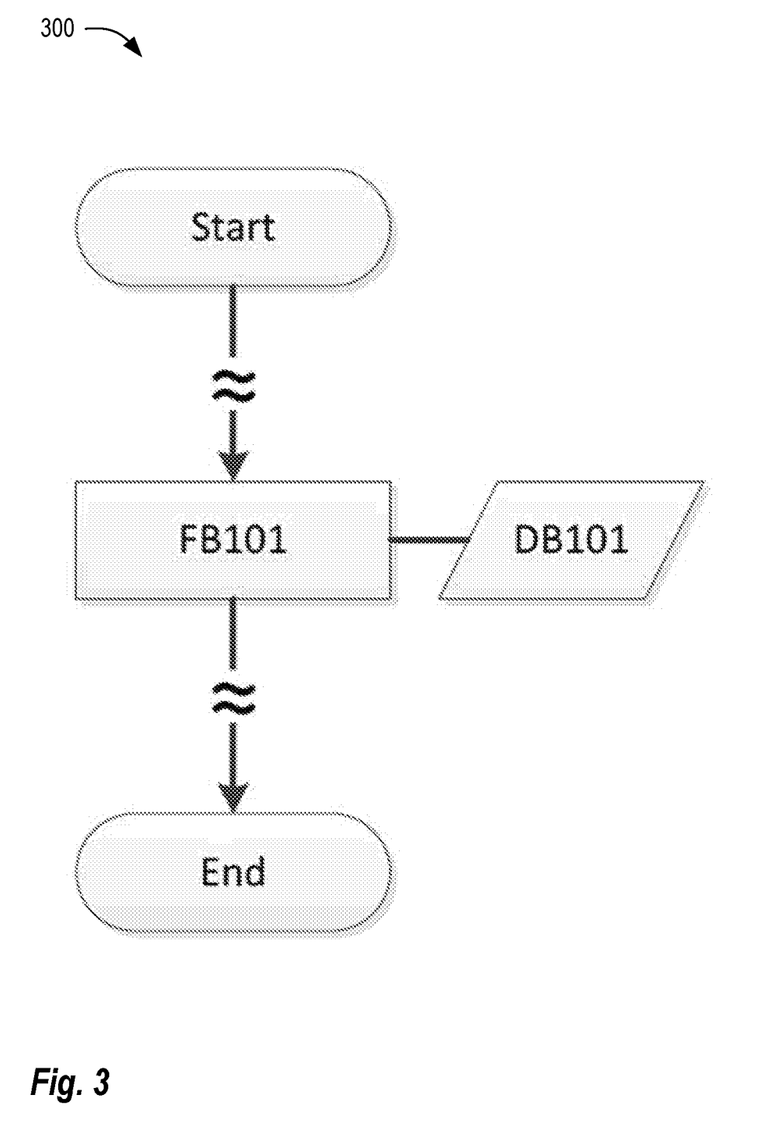
FIG. 3 provides an example of performing a failover method according to some embodiments by using a "revised replica" when a FB, FC or DB is comprised.

FIG. 3 provides an example of performing a failover method 300 according to some embodiments by using a "revised replica" when a FB or DB is comprised. The term "revised replica," as used herein, refers to a FB or DB which provides the same functionality or information, respectively, as another FB or DB, but with different low-level data. This revised replica can be obtained by making minor modifications to underlying source code. For example, the sequence of a several instructions could be changed without changing the control logic of the function block. Thus, this way can make it a little more complicated for hackers to compromise the replica. The implementation of a revised replica can vary according to the underlying system architecture. For example, in Siemens control systems, Statement List (STL) code is compiled to MC7 byte executable code, which is then transferred to the PLC. A revised replica of a FB could be created by creating a new FB which provides the same functionality as the original, but with a different MC7 byte code.

Continuing with reference to FIG. 3, all Organization Blocks (OBs) run from "Start" to "End," accessing PLC memory, reading FBs, FCs and DBs, and wring data back to DBs. When OBs are programmed, it should be considered what if one important FB, or FC or DB is compromised. Therefore, it needs to create other secure "paths" to run through the OB. The example of FIG. 3 shows FB101, a function block is called in OBxx. Note that DB101 is used by FB101, assuming this data block keeps data exchanged with other peer devices, such as HMI or PLC. Again, it is assumed that OBs are not compromised, and FB101 and DB101 can be compromised.

Figure 4:
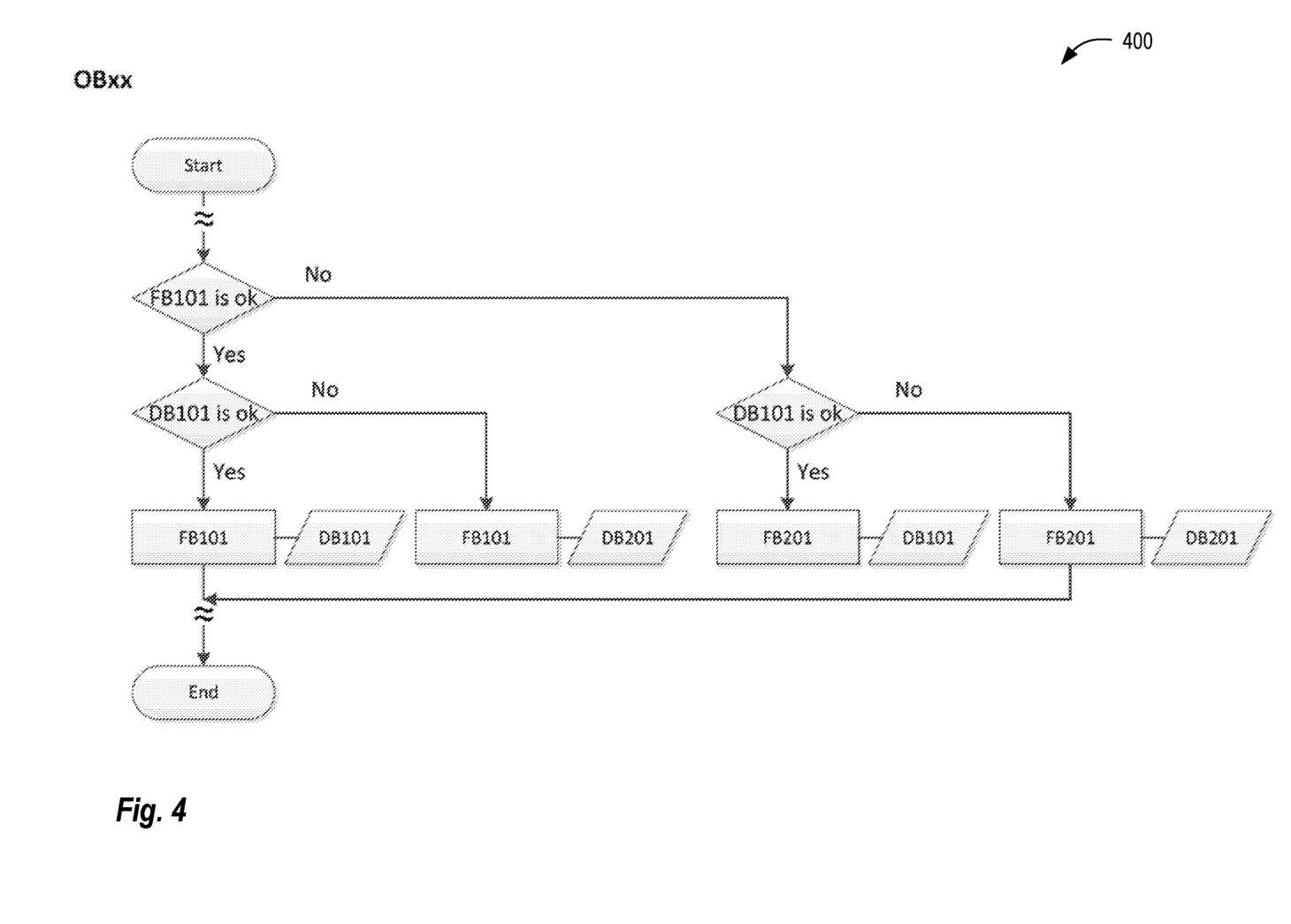
FIG. 4 demonstrates an example of a replica method for FBs, FCs and DBs, which replaces the original control instructions in OBxx, shown in FIG. 3.

FIG. 4 demonstrates an example of a replica method 400 for FBs and DBs, which replaces the original control instructions in OBxx, shown in FIG. 4. The revised replica of FB and DB are created as follows. FB201 is a revised replica of FB101 (e.g., FB201 has the same function as FB101, however, their MC7 codes are different). DB201 is a replacement of DB101 when the PLC detects that the received DB101 is compromised. There are several methods that may be used to create the data block replica. In some embodiments, DB101 is copied, as it was received and validated last time before it is compromised, to DB201. In other embodiments, the data block, DB 201 is created by extrapolating some data. For example, DB101 may include temperature readings. Thus, a set of calculated reading can be generated by extrapolating based on the previous readings which have been validated. In other embodiments, a set of commands/data are created in DB201, if DB101 includes commands from HMIs, to place the production process in safe mode or stop the production process in a safe way;

As shown in FIG. 4, the PLC first selects the normal function block FB101 and data block DB101 to run. If FB101 is compromised, the PLC will run FB201, the replica of FB101, instead. If DB101, the data block sent by peer PLCs or HMIs, is compromised, the PLC will use DB201, the replacement of DB101, instead. Note that, functions (FCs) can be processed the same as FBs. For example, a replica FC201 can be created for FC101. Again, FC201 can be tweaked a little and thus it has the same functionality as FC101, however, the MC7 code of FC201 is different from that of FC101.

To generalize the failover process, a mechanism can be built in the PLC to replicate all FCs, FBs and DBs, and before executing each FC or FB, an integrity check will be executed, and if the check is failed, the corresponding replica FC or FB or DB block will be used. This mechanism can be built in the engineering tool during the compilation process of user programs, so the engineers need not to be aware of the process. During the compilation, user programs such as FCs and FBs will be replicated with modification so their signatures will be different. During deployment, all user programs and replicated programs will be downloaded to the PLC. The PLC runtime will perform additional integrity checks and switch operations.

In some embodiments, one or more of the security failover scenarios discussed herein may be implemented using a redundant PLC implementation where data and execution is mirrored between the two PLCs. The various steps (e.g. checking the integrity of a DB or FB or FC) described in the above scenarios can be directly implemented on top of the existing data communication channels, allowing control to shift between the two PLC as necessary to respond to an attack.

Figure 5:
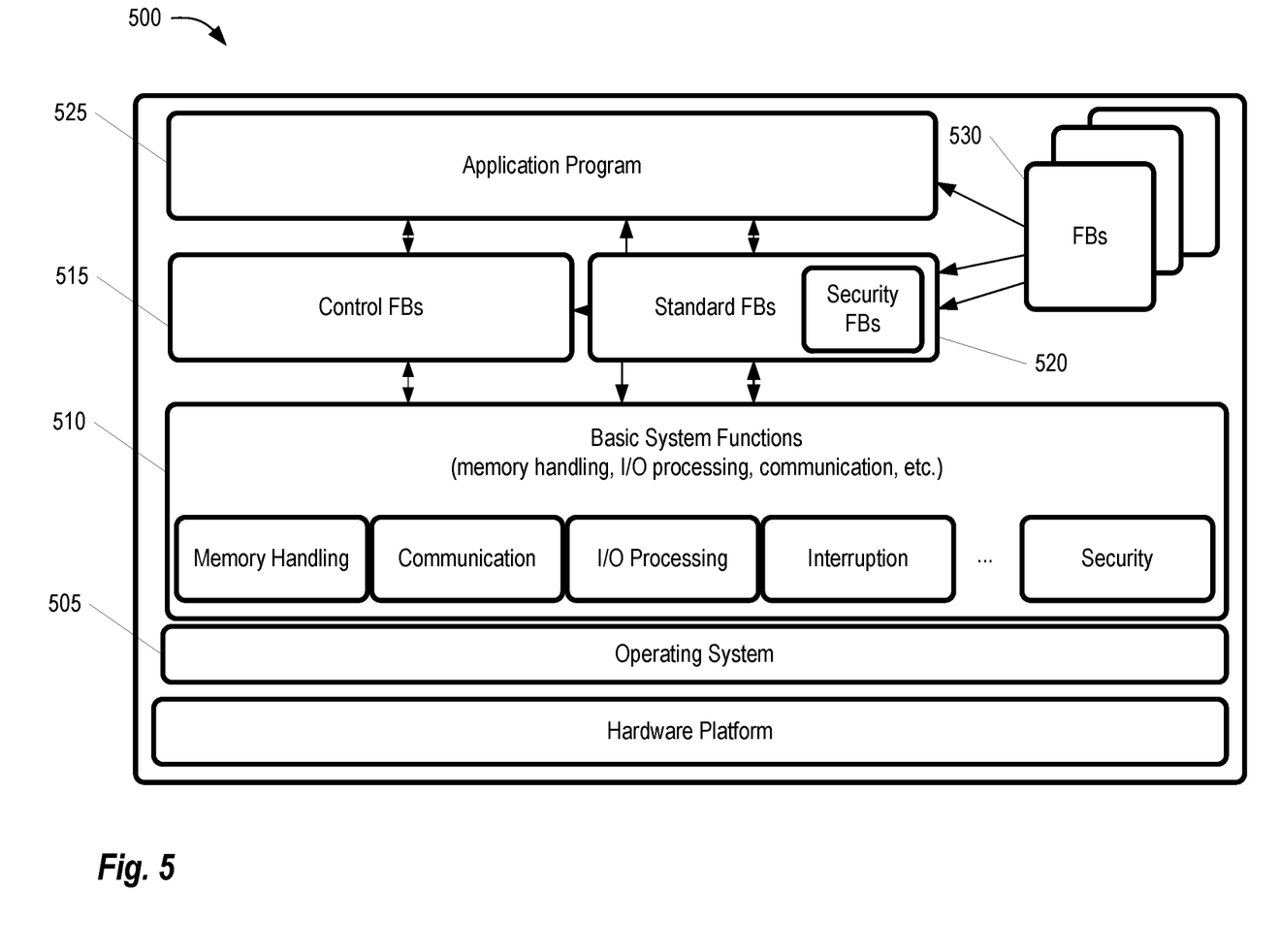
FIG. 5 provides an illustration of a PLC implementing a highly-coupled control-security system on legacy hardware, according to some embodiments.

In general, the techniques described herein may be implemented on any PLC or similar control-level device architecture. FIG. 5 provides an illustration of a PLC 500 implementing a highly-coupled control-security system on legacy hardware (e.g., Siemens Simatic S7 300), according to some embodiments. In the PLC 500, Basic System Functions 510, such as memory handling, I/O processing and communication, reside above the Operating System 505. Usually, system vendors provide some control Function Blocks (FBs) 515 (e.g., Proportional-Integral-Derivative control, motion control, etc. and other Standard FBs 520 (e.g., data parsing and data conversion). Some of the FBs 530 may be developed by users. Application Program 525 resides on the top layer of the PLC 500.

Since high-end PLC products possess enough computational power and memory, basic security functions, such as encryption and decryption, may be implemented within the Basic System Functions 510. Additionally, security FBs within the standard FBs 520 with interface of keys, session information, etc. are provided for users to call. Various security features may be provided within the Basic System Functions 510. For example, in some embodiments, the security functions include cryptography, access control (by device, MAC address, IP address, and even role), intrusion detection, and security incident event management. These security functions can be configured via system function block and all related data can be saved in system data block.

In some embodiments, security policies can be adjusted on the fly via system function blocks by the state of the control system. For instance, system vendors can upgrade or patch the control system only when the control system is not running critical production process to make sure the critical production process would not be interrupted. Additionally, in some embodiments, the security functions within the Basic System Functions 510 may be configured to inform the control system if it is under cyber-attack, whether the detected attack can be mitigated completely or partially. Thus, the PLC 500 or the control system as a whole can decide if it needs to operate in a safe mode, or stop the production after the current batch is finished, or stop the production right away.

In some embodiments, the security functions within the Basic System Functions 510 contain advanced sensors that generate log data specific to the requirements of a Security Information and Event Management (SIEM) system deployed for the entire network. Due to the intelligence of the control system, logging can be adjusted on the fly by command from SIEM system to address, for example, updated threat intelligence or indicators of compromise, hence beyond simple log levels that switch granularity. The result would be an improved quality of log data and thus a reduced rate of false positives at the SIEM. Advanced sensors can also include smart honeypots on the control systems, for example, where functionality is simulated during downtimes as any interaction of an unused device indicates a misuse with a very low false positive rate.

Figure 6:
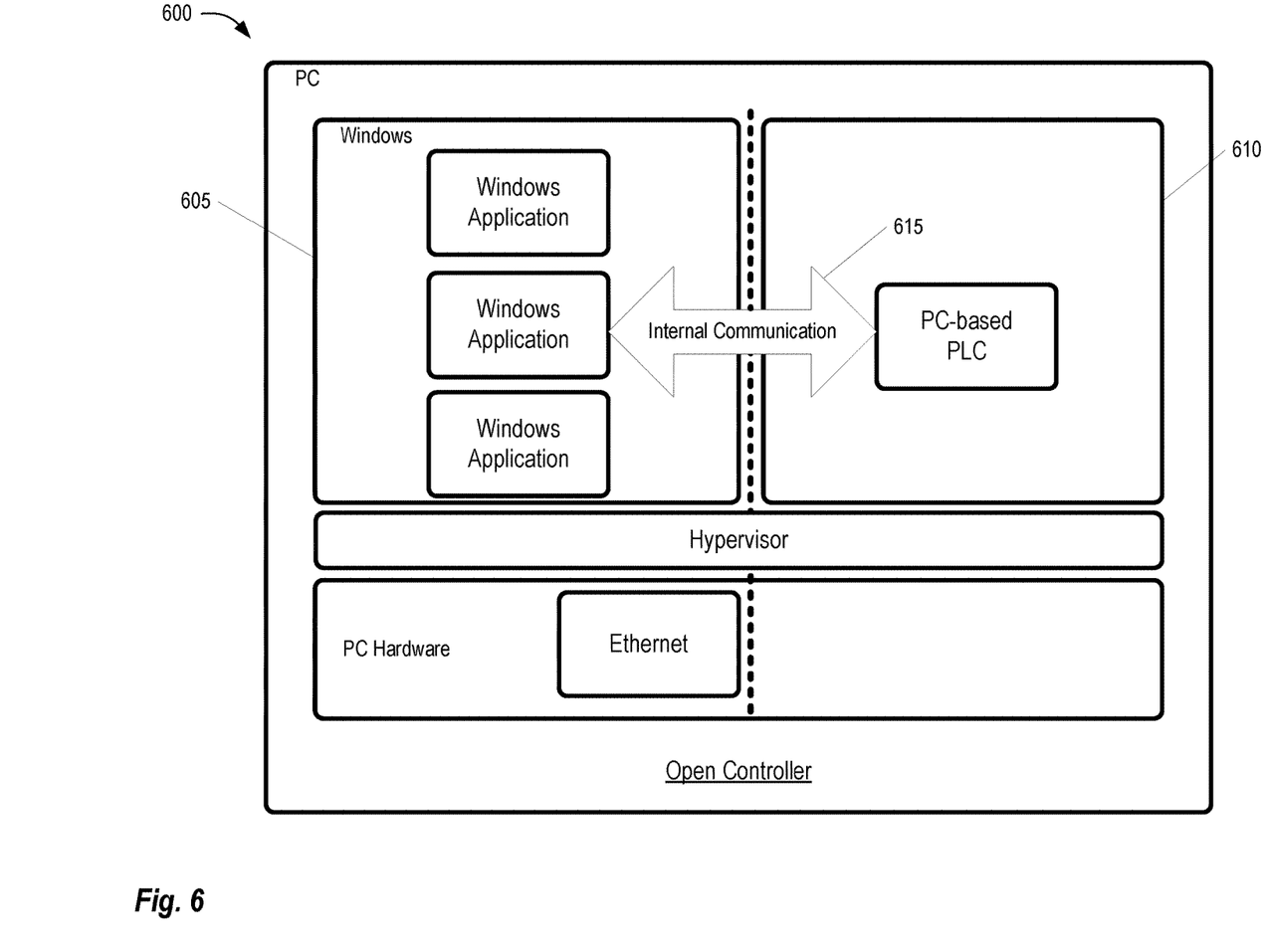
FIG. 6 shows an implementation of a security system on an Open Controller, according to some embodiments.

FIG. 6 shows an implementation of a highly coupled system 600 on an Open Controller, according to some embodiments. For example, Siemens SIMATIC ET 200SP Open PLC is a controller of this type that combines the functions of PC-based software controller with virtualization. As shown in FIG. 6, a PC hosts two virtual machines (two cores) 605 and 610, which run Windows applications and PLC applications, respectively. PLC and Windows applications interact with each other via Internal Communication 615. PC-based PLC is able to keep running even if Windows is shutdown. Based on this architecture, failover security functions may be implemented in either virtual machine 605 and 610. For example, virtual machine 605 may include one or more Windows applications dedicated to security functionality. Alternatively (or additionally) virtual machine 610 may include one or more FB-based security implementations similar to those discussed above with respect to FIG. 5. In some embodiments, based on Open Controller, an open source UNIX based network monitoring framework (e.g., Bro) may be utilized. Therefore, those security technologies developed for UNIX and Linux can be easily transplanted in control applications.

Figure 7:
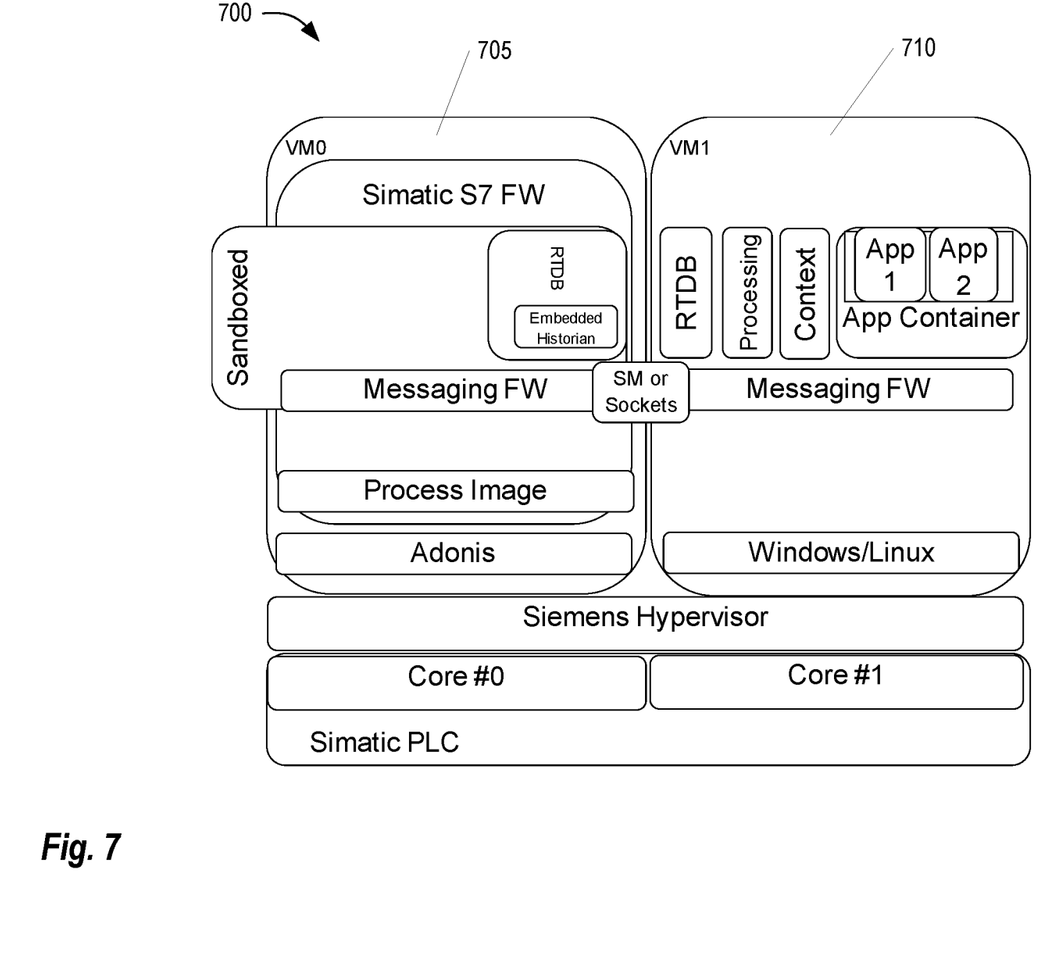
FIG. 7 demonstrates a control-security PLC with a cyber-security application, according to some embodiments.

FIG. 7 demonstrates a control-security PLC 700 with cybersecurity application, according to some embodiments. The PLC 700 has two cores where each runs as a virtual machine. In the example of FIG. 7, one virtual machine 705 is configured to implement Simatic S7 Firmware and the other virtual machine is 710 configured to implement either Windows or Linux. In the Simatic S7 PLC firmware within virtual machine 705, there is a real-time database driven by an embedded historian. It collects all real-time process image data as time series, such as inputs, outputs, memory variables, and commands from HMIs and the Management Execution System (MES). In the Windows/Linux virtual machine 710, another real-time database exchanges data with the real-time database (RTDB) hosted in Simatic S7 firmware. Although Simatic S7 firmware is used herein for illustrative purposes, it should be understood that other similar firmware implementations may be utilized in other embodiments.

The block of "Processing" in virtual machine 605 is a function block which performs primary data processing, reading/writing/filtering/smoothing primary data in the real-time database. The block of "Context" in virtual machine 605 works as a translator, which translates the meaning of all data into production knowledge, such as translating measurements into temperature (e.g. of a beer fermentation tank). There are multiple applications hosted by an App Container in the virtual machine 605, some of which can be directed at security functionality. For example, App1 could be used for cyberattack detection and App2 could perform failover operations (as described in FIGS. 1-4). They both need to work based on collected data in the real-time database. In this case, the proposed cyberattack detection app can be easily added, removed and updated, just as a Windows or Linux application.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the control layer devices and related computing infrastructure may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method for performing security failover in an industrial production environment, the method comprising:
   receiving, by a programmable logic controller, notification that a function block (FB) or a function (FC) on the programmable logic controller has been maliciously revised;
   determining, by the programmable logic controller, whether the function block or the function is also maliciously revised on a failover computing device;
   if the failover computing device is not maliciously revised, performing a failover operation comprising:
      sending, by the programmable logic controller, a data block comprising one or more input parameters to the function block or the function, and
      receiving, by the programmable logic controller, an output data resulting from executing the function block or the function with the data block on the failover computing device.

2. The method of claim 1, wherein the failover computing device is an automation device in the industrial production environment.

3. The method of claim 2, wherein the failover computing device is a second programmable logic controller, or a PC which can run the control programs in the PLC.

4. The method of claim 1, wherein the failover computing device is located in a computing environment remote from the industrial production environment.

5. The method of claim 4, wherein the failover computing device is directly or indirectly connected to the programmable logic controller over an industrial network.

6. The method of claim 1, wherein the failover operation further comprises:
   performing, by the programmable logic controller, one or more control operations using the output data.

7. The method of claim 1, wherein the function block or the function comprises a data portion and a digital signature portion and the programmable logic controller determines that the function block or the function is not maliciously revised on the failover computing device by determining that the digital signature portion of the function block or the function on the failover computing device is valid.

8. The method of claim 1, wherein the function block or the function on the failover computing device is a revised replica of the function block or the function on the programmable logic controller.

9. A method for performing security failover in an industrial production environment, the method comprising:
   receiving, by a programmable logic controller, a data block from an automation device over a network communication session;
   determining, by the programmable logic controller, that the data block has been maliciously revised;
   in response to determining that the data block has been maliciously revised, performing one or more of:
      replacing the data block with a revised replica of the data block for all subsequent operations performed by the programmable logic controller using the data block, and
      utilizing a plurality of alternative network sessions through one or more intermediary programmable logic controllers for future communications with the automation device.

10. The method of claim 9, wherein the plurality of alternative network sessions are used for future communications using a process comprising:
   transmitting, by the programmable logic controller, an inquiry message to a second programmable logic controller over a second network communication session inquiring whether the second programmable logic controller is communicating with the automation device;
   receiving, by the programmable logic controller, a response message from the second programmable logic controller indicating that the second programmable logic controller is communicating with the automation device over a third communication session; and
   transmitting, by the programmable logic controller, subsequent data blocks to the automation device via the second programmable logic controller using the second network communication session and the third communication session.

11. The method of claim 9, wherein the data block is a memory block comprising a data portion and a digital signature portion and the programmable logic controller determines that the memory block has been maliciously revised by determining that the digital signature portion is invalid.

12. The method of claim 9, wherein the revised replica of the data block is a copy of the data block previously received from the automation device.

13. The method of claim 9, wherein the revised replica of the data block is created by extrapolating data from one or more instances of the data block previously received from the automation device.

14. The method of claim 9, wherein the revised replica of the data block comprises one or more commands/data to place a production process operated by the programmable logic controller in safe mode or stop the production process in a safe way.

15. A system for performing security failover in an industrial production environment, the system comprising:
   a programmable logic controller comprising:
      a non-transitory computer-readable medium storing an application program comprising plurality of organizational blocks, a plurality of function blocks, and a plurality of data blocks; and
      one or more security function blocks configured to perform a failover operation in response to detecting a maliciously revised block among the organization blocks, function blocks, or data blocks, the failover operation comprising one or more of:
         (i) if the maliciously revised block is a function block or a function, utilizing an equivalent function block or function located on a failover computing device to perform operations for the function block or the function during execution of the application program,
         (ii) if the maliciously revised block is received from an automation device over a first networking session, utilizing a plurality of alternative network sessions through one or more intermediary programmable logic controllers for future communications with the automation device, or
         (iii) replacing the maliciously revised block with a revised replica of the maliciously revised block for all subsequent operations performed by the programmable logic controller using the maliciously revised block.

16. The system of claim 15, wherein the failover computing device is located in the industrial production environment.

17. The system of claim 16, wherein the failover computing device is a second programmable logic controller, or a PC which can run the application programs in the PLC.

18. The system of claim 15, wherein the failover computing device is located in a computing environment remote from the industrial production environment.

19. The system of claim 18, wherein the failover computing device is directly or indirectly connected to the programmable logic controller over an industrial network.

\* \* \* \* \*